April 8, 1952     P. LIDDICOAT     2,592,440
ROCK DRILLING TOOL
Filed June 26, 1946
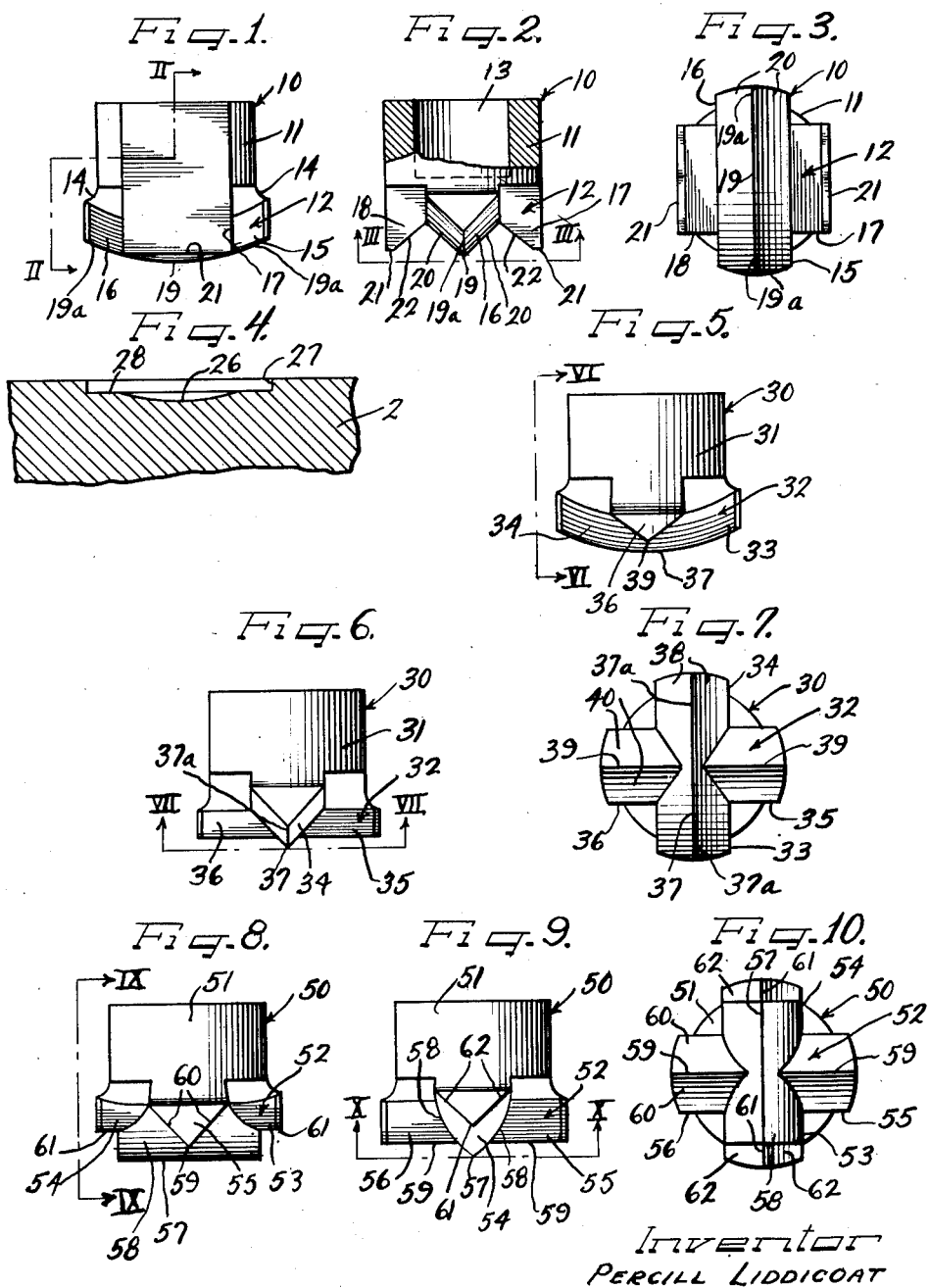
Inventor
PERCILL LIDDICOAT Patented Apr. 8, 1952

2,592,440

UNITED STATES PATENT OFFICE 2,592,440

ROCK DRILLING TOOL

Percill Liddicoat, Niagara on the Lake, Ontario, Canada, assignor to Thompson Products, Limited, St. Catharines, Ontario, Canada, a corporation of Ontario Application June 26, 1946, Serial No. 679,493

2 Claims. (Cl. 255—63)

This invention relates to drilling tools such as rock bits for cutting by percussive impact and rotative forces. The invention specifically deals with rock drills or bits which have cutting edges so disposed as to cut the rock or other material being drilled in a plurality of successive stages.

The drilling tools or bits of this invention are of generally cruciform shape in end elevation and have four wings arranged in two aligned pairs. A cutting edge extends radially along the wings of one pair and has a forwardly projecting central portion arranged to cut a pilot hole of less diameter than the desired diameter for the finished hole. The remaining pair of wings has reaming edges provided thereon on opposite sides of the cutting edge and extending to the full diameter of the bit so as to enlarge the pilot hole formed by the cutting edge to the finish diameter. The pilot hole centers the bit and prevents objectionable lateral movements during the drilling operation. The rock surrounding the pilot hole is materially weakened and is easily reamed out by the reaming edges which cut, break or shatter the weakened ledge surrounding the pilot hole. The reaming edges in turn act on the rock in advance of a final set of cutting edges which trail the reaming edges and are provided on the outer extremities of the wings carrying the pilot hole cutting edge. These final cutting edges accurately gauge the diameter of the hole to produce a uniform cylindrical bore of a consistent gauge irrespective of the depth of the hole.

The drilling bits or tools of this invention therefore have pilot hole cutting edges, reaming edges, and finish cutting edges arranged in successive levels to successively act on the material being drilled. Each edge is so positioned relative to the other edges as to provide for free discharge of drilled material thereby eliminating clogging or impacting of material that has already been shattered or drilled loose.

In one form of the invention the pilot hole cutting edge portion and the finish cutting edge portions are parts of a continuous arcuate edge with the center of the arc forming the pilot hole cutting edge and the other extremities of the arc forming the finish cutting edge. In this form of the invention the reaming edges are formed in spaced parallel relation on opposite sides of the arcuate edge on the outer end of a pair of wings in right angular relation to the wings on which the finish cutting edge portions are formed. The reaming edges have flat leading ends in trailing relation to the central pilot hole cutting edge portion of the arcuate edge but in advance relation to the finish cutting edge portions or extremities of this arcuate edge.

In a second embodiment of the invention the drill bit has a generally cruciform shape with four wings in two aligned pairs at right angles to each other and an arcuate edge extends continuously across one pair of the wings to define the central pilot hole cutting edge portion and the finish hole cutting edge portions as in the first form of the invention. However, the remaining pair of wings have radially extending reaming edges on opposite sides of the cutting edge. These reaming edges trail the pilot hole cutting edge central portion of the cutting edge but are in advance of the finish hole cutting edge portions or outer extremities of the cutting edge.

In a third form of the invention the drill bit has a generally cruciform shape in end elevation but the cutting edges on the one pair of wings are in two flat planes to provide a central pilot hole cutting edge and two offset finish hole cutting edges radially outward from the pilot hole cutting edge. The other pair of wings provide the reaming edges which extend radially on opposite sides of the pilot hole cutting edge in the same manner as in the second embodiment of the invention. In the third embodiment of the invention the pilot hole cutting edge preferably has curved diverging side walls.

It is then an object of this invention to provide a drill bit for percussive and rotative drilling operation with sequentially arranged cutting teeth for successively acting on the material being drilled.

A further object of the invention is to provide a drill bit of a generally cruciform shape in end elevation wherein a leading chisel edge extends radially of the end face of the bit and has at least a portion thereof projecting beyond all other portions to form a pilot hole during the drilling operation and wherein other chisel edges follow the pilot hole cutting chisel edge at successive levels to ream and finish cut the hole being drilled.

A further object of the invention is to provide a rock drill bit with cutting teeth arranged in successive levels and in increasing diameter.

A specific object of the invention is to provide a rock drill bit with wings arranged in aligned pairs wherein one pair of wings has radially extending pilot hole cutting and finish hole cutting chisel edges while another pair of wings has reaming edges in spaced relation on opposite sides of the pilot hole cutting edge.

A general object of the invention is to provide a rock drill bit which is faster in cutting speed, retains its cutting edges for greater drilling distances and preserves its reaming edges.

Another general object of the invention is to provide a rock drill bit which has a pilot hole cutting portion to center and stabilize the drill laterally during the drilling operation.

Other and further objects of the invention will be apparent to those skilled in the art from the following detailed description of the annexed sheet of drawings which, by way of preferred examples only, illustrate three embodiments of the invention.

On the drawings:

Figure 1 is a side elevational view of the first form of drill bit according to this invention.

Figure 2 is a vertical cross sectional view, with parts in elevation, taken along the line II—II of Fig. 1.

Figure 3 is an end elevational view or bottom plan view taken along the line III—III of Fig. 2.

Figure 4 is a diagrammatic view illustrating the contour of a hole drilled by the drill bit of Figs. 1 to 3.

Figure 5 is a side elevational view of a second form of drill bit according to this invention.

Figure 6 is an elevational view taken along the line VI—VI of Fig. 5.

Figure 7 is an end elevational view or bottom plan view taken along the line VII—VII of Fig. 6.

Figure 8 is a side elevational view of a third embodiment of the invention.

Figure 9 is an elevational view taken along the line IX—IX of Fig. 8.

Figure 10 is an end elevational view or bottom plan view taken along the line X—X of Fig. 9.

As shown on the drawings:

In Figs. 1 to 3 inclusive the rock drill bit 10 is composed of a generally cylindrical body 11 with an enlarged cruciform shaped head 12 at one end thereof and a socket 13 extending inwardly from the other end thereof. The socket 13 is adapted to receive a drill rod or the like device for operatively mounting the bit. The cruciform head 12 is of larger diameter than the main body 11 and merges into the main body along curved shoulders 14 which connect the outer extremities of the cruciform wings with the main body.

The head 12 has four radially extending wings including a first aligned pair of wings 15 and 16 and a second aligned pair of wings 17 and 18 in right angular relation to the first pair of wings.

A chisel cutting edge 19 extends radially in a convex or arcuately curved path midway between the sides of the first pair of wings 15 and 16 and completely across the face of the bit. This chisel edge 19 is bounded on its opposite sides by oppositely inclined side walls 20. The second pair of wings 17 and 18 have reaming edges 21 at their outer extremities. These edges 21 are straight and extend parallel to the edge 19 in spaced relation therefrom for the full width of the wings. The reaming edges 21 lie in a flat plane normal to the axis of the bit at a level intermediate the central and end portions of the chisel edge 19. Oppositely inclined end walls 22 extend axially and radially inward from the reaming edges 21 to the bases of the side faces 20 for the chisel edge 19.

The outer extremities 19a of the chisel edge 19 as best shown in Fig. 1 trail the reaming edges 21. The chisel edge 19 therefore has a central cutting portion in advance of the reaming edges 21 and outer end portions 19a in trailing relation to the reaming edges 21. The entire chisel edge 19 however is on a single arcuate or convex curved line.

The wings 17 and 18 are, as shown in Fig. 3, materially wider than the wings 15 and 16 but are somewhat shorter than the wings 15 and 16 in that they have flat outer faces. However, the corner edges of the wide wings 17 and 18 are spaced from the axial center of the bit a distance equal to the radius of the curve forming the rounded outer faces of the wings 15 and 16. In other words the diagonal distance between the ends of the two reaming edges 21 is equal to the diameter of the circle including the outer faces of the wings 15 and 16.

In operation of the bit of Figs. 1 to 3, as shown in Fig. 4, rock 25 will first be cut by the leading central portion of the chisel edge 19 to form a leading pilot hole 26 of lesser diameter than the main hole 27. This leaves a ledge 28 of the rock between the pilot hole and the main hole. This ledge is easily shattered and cut by the straight reaming edges 21. Since these edges 21 are not segments of a circle as is customary in rock drills a greater cutting area on the ledge 28 is obtained due to the sweeping arc of a straight line revolved about an axis spaced laterally out of its plane. In addition the straight line reaming edges 21 only bear against the side wall of the main hole 27 at four narrow end points thereby reducing frictional resistance to rotation of the drill.

As the reaming edges break up the rock of the ledge the final cutting edges 19a come into play and size the hole to the finished diameter. As a result the hole 27 will be of uniform circular cross section irrespective of its depth. The leading chisel edge portion 19, in forming the pilot hole 26 in advance of the main hole, holds the bit centrally of the hole and prevents lateral wobbling action tending to change the gauge of the hole. The reaming edges rapidly cut away the ledge and enlarge the hole and the final cutting edges finish the operation to smooth the hole. The bit therefore acts on the rock in three successive stages with three different sets of cutting edges, each designed for carrying out their respective function in succession.

The drill bit 30, forming the second embodiment of the invention, and illustrated in Figs. 5 to 7 inclusive, includes a cylindrical body 31, the same as the body 11 of the drill bit 10, and an enlarged generally cruciform shape head 32. The head 32 is composed of four wings including a first pair 33 and 34 in radially aligned relation and a second pair 35 and 36 in radially aligned relation at right angles to the first pair. A convex chisel-like chopping edge 37 extends diametrically across the end face of the bit along the longitudinal center of the wings 33 and 34 and is bounded by oppositely inclined flat faces or side walls 38.

The other pair of wings 35 and 36 have radially extending reaming edges 39 extending radially outward from the transverse center of the inclined faces 38 in spaced relation from opposite sides of the cutting edge. 37. These reaming edges 39 are bounded by flat oppositely inclined faces 40.

The convex chopping edge 37 has a central portion thereof at a level beyond the reaming edges 39 and has the outer extremities 37a thereof at levels inwardly of the reaming edges 39. Therefore the bit 30, like the bit 10, has a convex or accurately curved chopping edge with a central portion forming the leading edge of the bit face and with end portions forming trailing edges of the bit face. The leading edge is in advance of the reaming edges for cutting the pilot hole such as 26 shown in Fig. 4. The reaming edges next engage the material being drilled to cut the ledges such as 28 around the pilot hole. The trailing cutting edges 37a then come into use for engaging the hole to finished diameter. The reaming edges 39 differ from the reaming edges 21 of the bit 10 in that they extend radially from the mid-portion of the cutting edge on opposite sides of the cutting edge whereas the reaming edges 21 are parallel to the cutting edge.

The drill bit 50, forming the third embodiment of the invention, shown in Figs. 8 to 10 of the drawings, like the bits 10 and 30, has a generally cylindrical main body 51 for attachment to a drill rod and a generally cruciform shaped enlarged cutting head 52 composed of four wings in two aligned pairs at right angles to each other including a first aligned pair 53 and 54 and a second aligned pair 55 and 56. The first pair 53 and 54 has a chisel cutting edge 57 lying in a flat plane normal to the axis of the bit and extending diametrically or radially along the central portion of the wings only. This cutting edge 57 is bounded by curved diverging walls 58 of convex contour as best shown in Fig. 9. The cutting edge 57 thus terminates inwardly of the radial outer ends of the wings 53 and 54.

The other pair of wings 55 and 56 has radially extending reaming edges 59 bounded by flat diverging side walls 60. The reaming edges 59 extend radially outward from opposite walls 58 in spaced relation from the mid-point of the cutting edge 57. These reaming edges 59 extend to the full diameter of the head 52.

The radially outer ends of the wings 53 and 54 have finish cutting edges 61 radially aligned with the cutting edge 57 but offset therefrom at a level in trailing relation to the reaming edges 59. These finish cutting edges 61 are bounded on opposite sides by oppositely inclined flat side walls 62 as best shown in Fig. 9.

In the third embodiment of the invention therefore the drill bit has a radially extending leading cutting edge 57 lying in a flat plane normal to the axis of the bit. This cutting edge 57 will form a pilot hole with a flat bottom and a straight cylindrical side wall. When the pilot hole is deep enough so that the reaming edges 59 can engage the rock on the ledges surrounding the pilot hole these reaming edges will come into play for increasing the diameter of the pilot hole to approximately the finished hole diameter. As the reaming edges advance to chop away the ledges of rock, the finish cutting edges 61 come into play to gauge the hole to its finished diameter. The pilot hole cutting edge, the reaming edges, and the finish hole cutting edges each lie in different flat planes normal to the axis of the bit.

From the above descriptions it will be understood that this invention now provides drilling tools which have a generally cruciform shape active end head with chisel-like cutting edges arranged to act in succession for first cutting a pilot hole, secondly for reaming the ledges surrounding the pilot hole to the full hole diameter and thirdly for finish cutting the hole to maintain the desired gauge. The drill bits of this invention are especially adapted for use with rock drilling equipment of the percussive and rotative type.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a rock drill bit a member having a transverse cutting edge on an end face thereof with a central projecting portion arranged to cut a small diameter pilot hole in advance of the main hole, and said end face having a pair of reaming edges on opposite sides of said cutting edge and parallel thereto for enlarging the pilot hole, said reaming edges being in trailing relation to said central projecting portion of said cutting edge.

2. A drill bit comprising a bit body having an active end face with a transversely extending arcuately curved convex cutting edge, said active end face also having reaming edges in spaced parallel relation on opposite sides of said cutting edge, said reaming edges being disposed at a level intermediate the central and outer end portions of said cutting edge, and each of said reaming edges lying in a chord of a circle defined by rotation of said cutting edges about its axis.

PERCILL LIDDICOAT.

REFERENCES CITED

The following references are of record in the file of this patent:

UNITED STATES PATENTS

| Number | Name | Date |
| --- | --- | --- |
| 63,681 | White | Apr. 9, 1867 |
| 1,007,037 | MacDonald | Oct. 24, 1911 |
| 1,463,848 | Shimin | Aug. 7, 1923 |
| 1,873,814 | Brewster | Aug. 23, 1932 |
| 2,168,102 | Nast | Aug. 1, 1939 |
| 2,191,493 | Reilly | Feb. 27, 1940 |
| 2,262,001 | Hokanson | Nov. 11, 1941 |

OTHER REFERENCES

Subways and Tunnels of New York, by Gilbert et al., 1912, pages 298 and 300.